United States Patent [19]

Nakajima et al.

[11] Patent Number: 5,401,127
[45] Date of Patent: Mar. 28, 1995

[54] ROTATIVE CUTTING TOOL OF TIP DRESSER

[75] Inventors: Toshiharu Nakajima; Tadashi Goto; Shinji Hoshino, all of Suzuka, Japan

[73] Assignee: Honda Giken Kogyo Kabushiki Kaisha, Tokyo, Japan

[21] Appl. No.: 99,494

[22] Filed: Jul. 28, 1993

[30] Foreign Application Priority Data

| Jul. 31, 1992 | [JP] | Japan | 4-204699 |
| Jul. 31, 1992 | [JP] | Japan | 4-204700 |
| Feb. 10, 1993 | [JP] | Japan | 5-022603 |
| Feb. 19, 1993 | [JP] | Japan | 5-030226 |

[51] Int. Cl.$^6$ .......................... B23C 3/12; B23K 11/30
[52] U.S. Cl. ..................................... 409/131; 409/140; 409/181
[58] Field of Search ............... 409/140, 138, 175, 181, 409/131, 132; 219/119; 407/33, 35, 44, 45, 56

[56] References Cited

U.S. PATENT DOCUMENTS 4,578,005  3/1986  Fuse et al. ..................... 409/140

FOREIGN PATENT DOCUMENTS

| 138072 | 5/1989 | Japan | 409/140 |
| 624590 | 6/1949 | United Kingdom | 409/140 |
| 1189104 | 4/1970 | United Kingdom | 409/140 |

Primary Examiner—William Briggs
Attorney, Agent, or Firm—Nikaido, Marmelstein, Murray & Oram

[57] ABSTRACT

The present invention is directed to presenting rotative cutting tool of tip dresser. The blade to cut and repair side surface and/or edge surface of welding electrode tip is mounted in the holder with first tapered portion having the same angle of the blade to cut side surface of the electrode tip and second tapered portion having angle a little different from the first tapered angle in a recess of frustconical shape of the holder, said holder being provided with empty space so as to expel every cut powder of electrode tips generated in cutting and repairing operation from the recess of frustconical shape of the holder and tip of the blade has a small roundness or chamfer finishing.

17 Claims, 11 Drawing Sheets

ROTATIVE CUTTING TOOL OF TIP DRESSER

FIELD OF THE INVENTION

The present invention relates to a rotative cutting tool of tip dresser for cutting and dressing welding electrode tips.

BACKGROUND OF THE INVENTION
PRIOR ARTS

There have been disclosed various means and apparatuses for cutting and dressing welding electrode tip by means of such as compressed air, hydraulic pressure, electric motor, gears, belts, chains to rotate the blades. The blades are applied for cutting side surface and edge surface of welding electrode tip. In order to cut left, right and edge surfaces of welding electrode tip, the blade comprising side surface cutting blade and edge surface cutting blade provided in one combined structure form has heretofore been applied. Host typical tip dressers are disclosed, for instance, in U.S. Pat. Nos. 2,930,289, 4,578,005, 4,966,506.

However, there has been a technical problem in prior arts. As side surface cutting blade and edge surface cutting blade are combined in one structure form, it is necessary to grind a whole blade or to replace a whole blade when only one portion of the blade is damaged in operation. This is considered troublesome in continuous operation of a large number of machines. Moreover, it is rather difficult to cut a tapered welding electrode tip.

It is, therefore, an object of the present invention to provide a tip dresser which can cut a tapered welding electrode tip easily, to prevent the blade being damaged, and yet grinding and replacement work of the blade is carried out easily.

SUMMARY OF THE INVENTION

To achieve the above mentioned object, in the present invention a tip dresser is provided in cutting holder with Y shape chip which can cut side surface and/or edge surface. It has also taken up to provide with a triangle chip to cut the side surface together with the blade to cut the edge surface or to combine Y shape chip and triangle chip together. It is provided a recess of frustconical shape upward and downward in the central portion of the cutting blade holder. It is also carefully considered to provide a complete empty space in the holder around whole contour of the blades which the blades contact with the tips to be cut and repaired by the same. It is also considered to provide on the cutting blade holder surface with a first tapered portion which has the same angle as that of the blade to cut side surface of the welding electrode tip. It is further considered to provide in the annexed portion to the first tapered portion on the cutting blade holder surface with a second tapered portion which has a different angle from that of the first tapered portion. The first tapered portion is recommended to provide a slight difference from the blade surface though it has the same angle as the angle which the tip contacts with the blade. The second tapered portion is provided consecutively to said first tapered portion from the position with a little larger diameter of the tip to be treated. The angle of said second tapered portion is slightly smaller than that of said first tapered one.

The edge surface of the welding electrode tip is cut by means of the blade of Y shape chip or triangle chip. The side surfaces of welding electrode tip is also cut by means of the blade of Y shape chip or triangle chip. The Y shape chip blade and the triangle chip blade are combined with each other for cutting and repairing welding electrode tips. Unlike conventional tip dresser, in the present invention the Y shape chip blade and the triangle chip blade are mounted independently in the cutting blade holder, each of the cutting blade can be replaced or ground independently when the blade is damaged. It is not required to replace both blades at a time. As described in the foregoing, according to the present invention, there is provided a complete empty space around the contour of the whole blades which contact the side surface and edge surface of the tips to be cut and repaired. Thus the cut powder of the electrodes generated in the cutting operation is dropped off downward through said groove which make an empty space and never accumulate in the upper recess of frustconical shape in the holder. This fact is highly evaluated in the present invention to prevent the applied blades from being damaged in operation. There are also provided in the holder the first and the second tapered portions adjacent with each other. When pressure to the welding electrode tip is weakened in the cutting operation, the electrode tip is swingably held due to cutting friction existing between the blade and the side surface of the electrode tip, also due to asymmetrical shape of the two blades in the holder. It, therefore, becomes possible to cut off every boss and burr from the tip of the electrode tip. It is also possible to treat tapered welding electrode tips.

BRIEF DESCRIPTION OF THE DRAWINGS

FIG. 11 relates to a perspective view of a throwaway chip, another example of the present invention. (a) is a perspective view of a throwaway chip whose tip of the blade is slightly rounded off. (b) is a sectional view of the blade. (c) is a sectional view of a throwaway chip whose tip of the blade is sharpened to impart a favorable cutting effects.

DETAILED DESCRIPTION OF THE PREFERRED EMBODIMENTS

Figure 1:
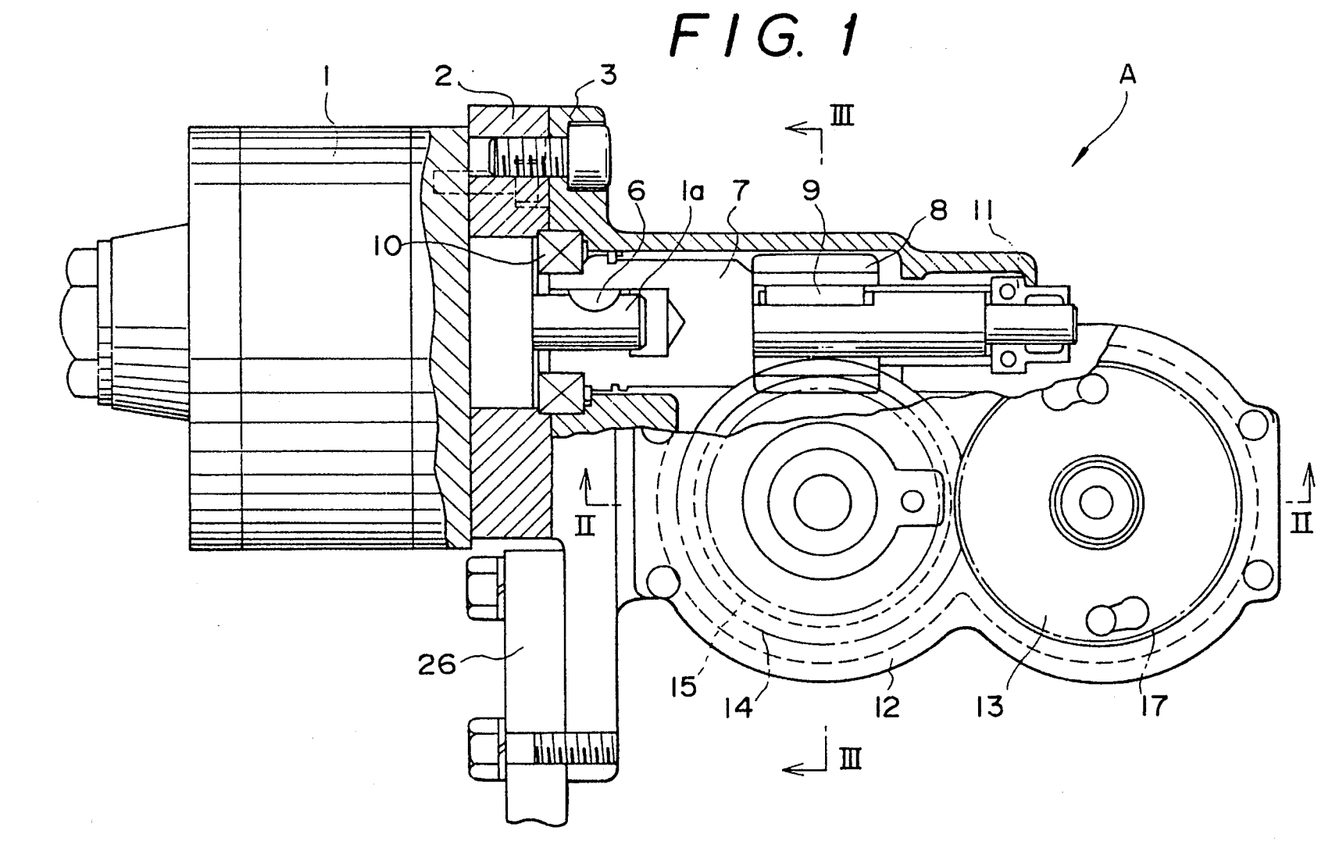
FIG. 1 is a top plan view, partially sectioned, of a tip dresser according to the present invention.
Figure 2:
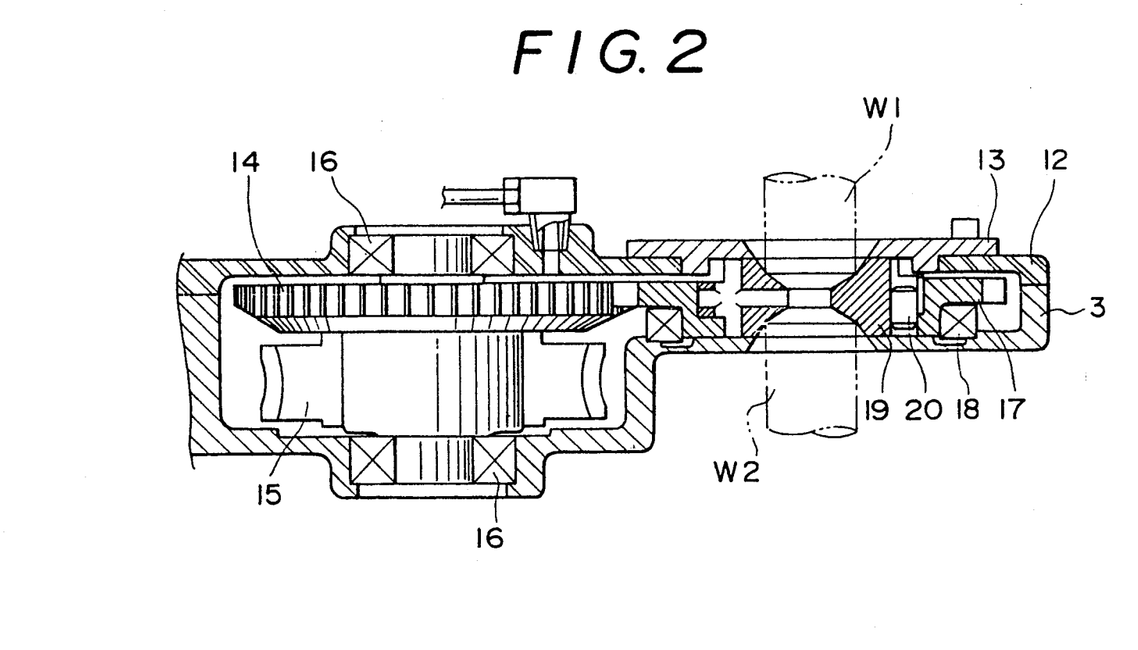
FIG. 2 is a sectional view taken along the II—II line in FIG. 1.
Figure 3:
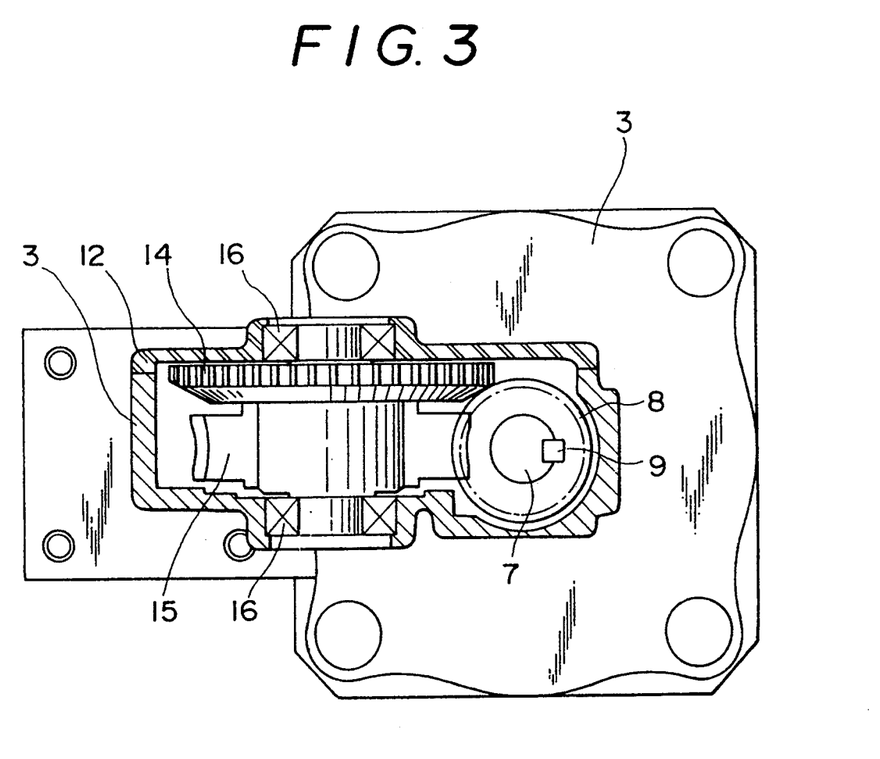
FIG. 3 is a sectional view taken along the III—III line in FIG. 1.
Figure 4:
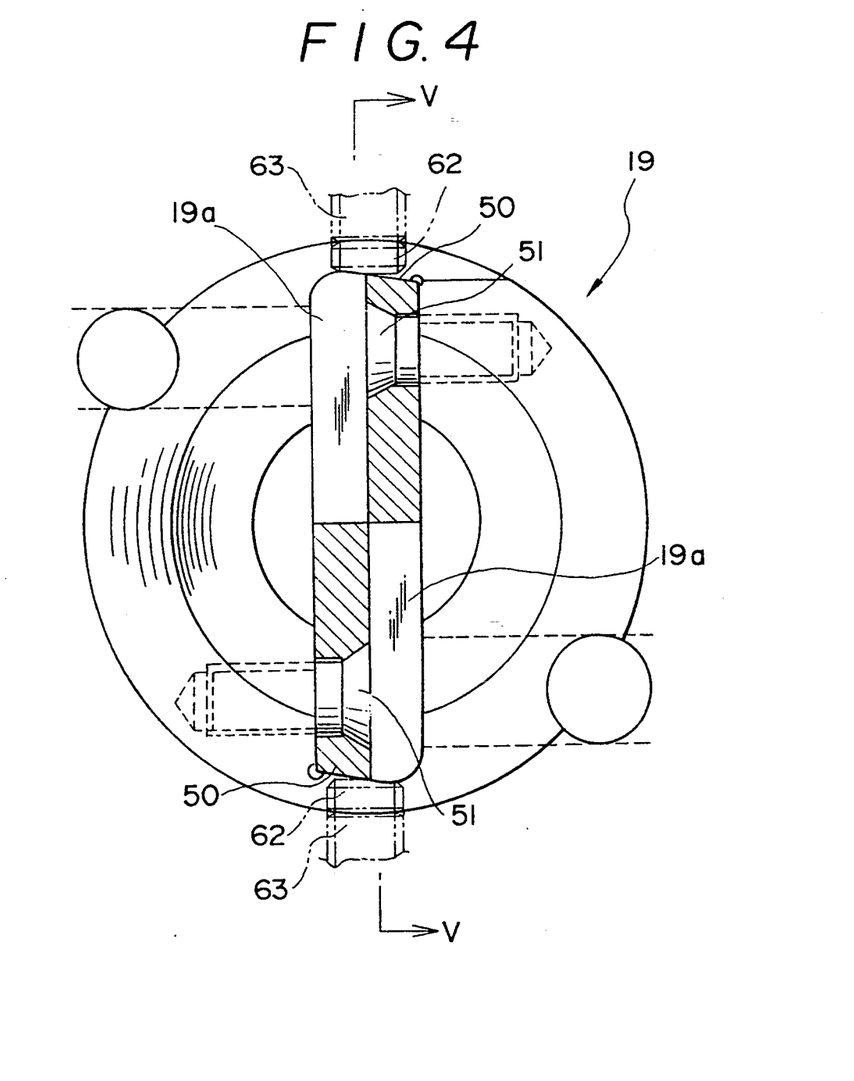
FIG. 4 is an enlarged view of the relative cutting tool according to the present invention.
Figure 5:
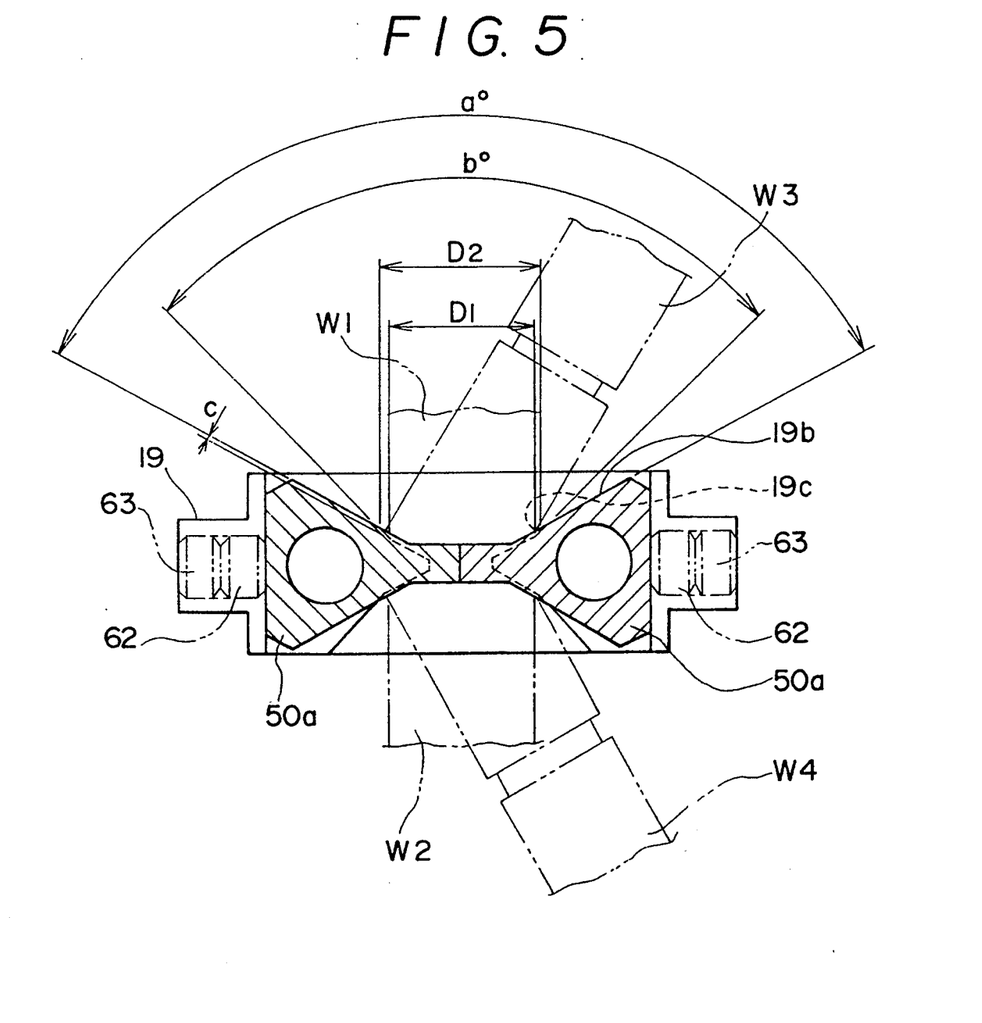
FIG. 5 is a sectional view taken along the V—V line in FIG. 4.

The present invention will be hereinafter described with reference to preferred embodiment.
First preferred embodiment FIG. 1 is a top plan view, partially sectioned, of a tip dresser according to the present invention. FIG. 2 is a sectional view taken along the II—II line in FIG. 1. FIG. 3 is a sectional view taken along III—III line in FIG. 1. FIG. 4 is an enlarged view of the rotative cutting tool according to the present invention. FIG. 5 is a sectional view taken along V—V line in FIG. 4.

As shown in FIG. I, FIG. 2 and FIG. 3, reference character A indicates tip dresser, reference numeral 2 indicates base plate and reference numeral 3 indicates main case body. Reference numeral 1 indicates power source and 1a indicates power drive shaft, reference numeral 6 and 9 indicate keys, reference numeral 7 indicates power transmission shaft. The tip dresser comprising a power source 1, a power transmission shaft 7 which is mounted on the power drive shaft 1a by means of key 6, a worm gear 8 which is securely fixed substantially in the center of said driving shaft 7 by means of key 9, a gear main body 14 which is securely compressed with worm wheel 15 to engage with said worm gear 8, a pinion gear 17 to engage with said main gear body 14 securely fixed in tile center of a holder 19 by means of a knock pin 20.

The main case body 3 is securely mounted on the supporting member 26 and is covered with case cover 12 by means of thread. To facilitate replacement work for the holder 19, a cover 13 is fixed to case cover 12 by means of thread above the holder 19. The edges of power transmission shaft 7 are rotatably supported with bearings 10 and 11. The edges of worm wheel 15 and main gear body 14 are rotatably supported with bearings 16, 16. The pinion gear 17 is rotatably supported by means of bearing 18.

The holder 19 is rotated by a consecutive rotational movement of pinion gear 17, main gear 14, worm wheel 15, worm gear 8 and power transmission shaft 7 which transmit the driving power from the power source 1.

The holder, as shown in FIG. 4, FIG. 5, FIG. 6 and FIG. 7, presents nearly a disc shape. It has the groove or the empty space 19a of almost rectangular configulation. The blade 50 is mounted by means of a screw 51 on the holder to cut and dress side surface and edge surface of welding electrode tips W1, 42. To facilitate expulsion of cut powder of the electrode tips to be cut, together with other experience in practical operation, it is desired to fix said screw 51 whose head never protrude beyond surface of said blade. The holder 19 has the first tapered portion 19b and the second tapered portion 19c whose tapered angle is different from that of the first tapered portion 19b.

The first tapered portion 19b has the same angle (a°)(120°) as the angle of the blades 50 to cut the side surface of welding electrode tips W1 and W2. It has a slight protrusion (C) beyond said blade surface. The second tapered portion 19c annex to the first tapered portion 19b at the position of width D2 which is slightly larger than the diameter D1 of the welding electrode tips W1 and W42. The angle of the second tapered portion is set with an angle of (b°) (90°) which is slightly smaller than the angle of the first tapered portion. In the embodiment of the present invention value of 0.1-0.4 mm was given to (C). The most favorable result was obtained with the value within 0.15-0.2 min.

When pressure to the welding electrode tips is weakened the first and the second tapered portions provided in the holder generate somewhat swing motion in W1 and W2 due to cutting friction existing between the side surface of the electrode tip and the cutting blade and also there is provided no fixed guide in the holder except tapered portions. It is, therefore, possible to eliminate every boss or burr from the tips. This is a great advantage of the present invention not performed in conventional tip dressing. The tapered portions also give a possibility to cut and repair the electrode tips with angle.

The present invention applies Y shape chip or triangle chip for cutting side surface and edge surface of the welding electrode tips W1 and W2. It is required to replace only one blade 50 which was damaged or shortened its useful life. The cutting blade protruded at one corner of Y shape chip has a clearance angle of 1 to 5 degree. If the clearance angle goes beyond 5 degree, the cutting blade will damage the electrode tip as cutting and repairing work is carried on. If the clearance angle goes less than 1 degree, it becomes difficult to cut the electrode tip. Thus the clearance angle is defined within 1-15 degree.

The groove making the empty space portion 19a in the holder can facilitate expulsion of cut powder of the welding electrode tips W1 and W2. The cut powder of the electrodes generated in the cutting operation is dropped off downward through the empty space portion, thus it prevents blade 50 from being damaged. Number of replacement work of blade 50 is decreased in practical operation and working effect is increased.

Second preferred embodiment

Figure 6:
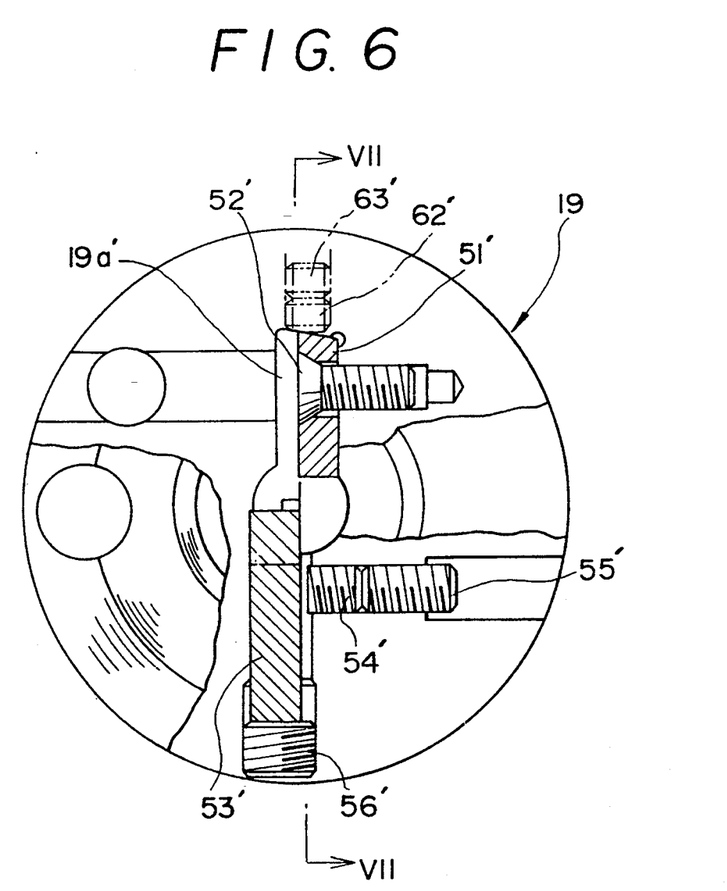
FIG. 6 is a top plan view of the rotative cutting tool according to the present invention.
Figure 7:
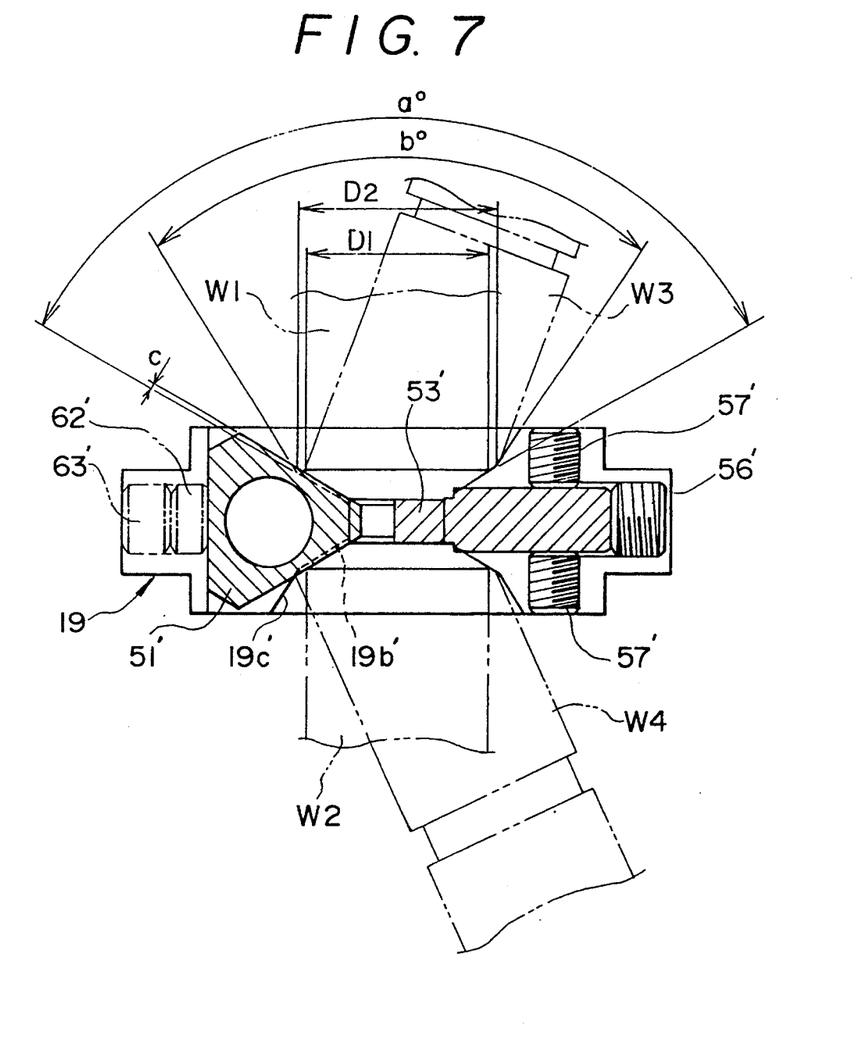
FIG. 7 is a sectional view taken along the VII—VII line in FIG. 6.

FIG. 1 is a top plan view, partially sectioned, of a tip dresser according to the present invention. FIG. 2 is a sectional view taken along the II—II line in FIG. 1. FIG. 3 is a sectional view taken along III—III line in FIG. 1. FIG. 6 is a top plan view and sectional view. FIG. 7 is a sectional view taken along the VII—VII line in FIG. 6.

As to FIG. 1, FIG. 2 and FIG. 3, the contents of the drawings were explained in the foregoing paragraphs. As indicated in FIGS. 6 and 7, the holder 19 presents almost disc shape and it has a groove making an empty space portion 19a' which is almost rectangular shape. There is provided a triangle chip to cut the side surface of welding electrode tips W1 and W2 on the edge portion of said holder by means of a screw 52'. The head of the screw should be securely fixed so as not to protrude beyond the surface of the blade. The triangle chip 51' is located with its backside tightly pressed against the holder 19. It is possible to locate the triangle chip 51' by providing small thread 62' and 63' in the holder 19.

The angle of the first tapered portion 19b' is the same angle as the angle of the blade of the triangle chip 51' to cut the side surface of the welding electrode tips W1 and W2. The other blade 53 ' to cut the edge surface of the welding electrode tips W1 and W2 is secured in the holder 19 by means of small threads 53', 55' and 57 ' together with press thread 56'. The clearance angle of the edge surface cutting blade 53' is defined within 1-5 degree. Unlike conventional cutting blade the blade of the present invention is devided to a triangle chip 51d' and an edge surface cutting blade 53 ', it is sufficient to replace only one blade which is damaged fastly or useful life of the blade is shortened.

Figure 8A:
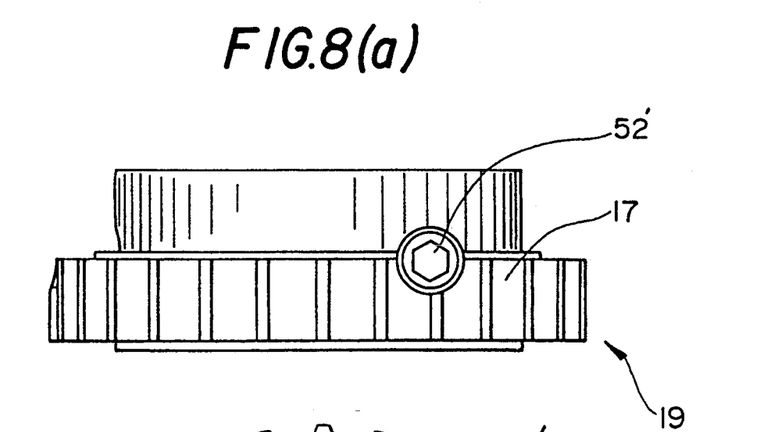
FIG. 8(a) is a side view of the rotative cutting tool of another embodiment of the present invention and (b) is a top plan view of the (a).
Figure 8B:
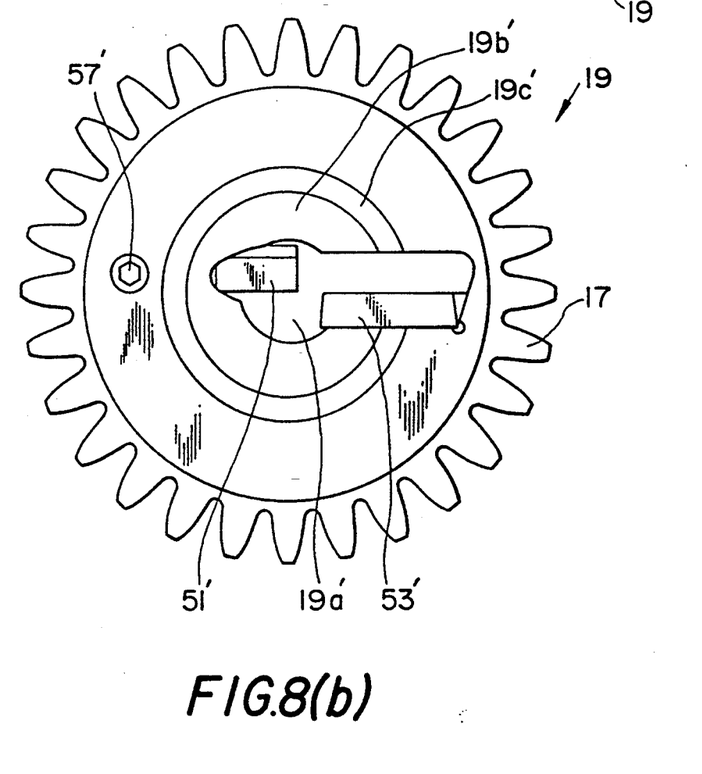
Figure 9A:
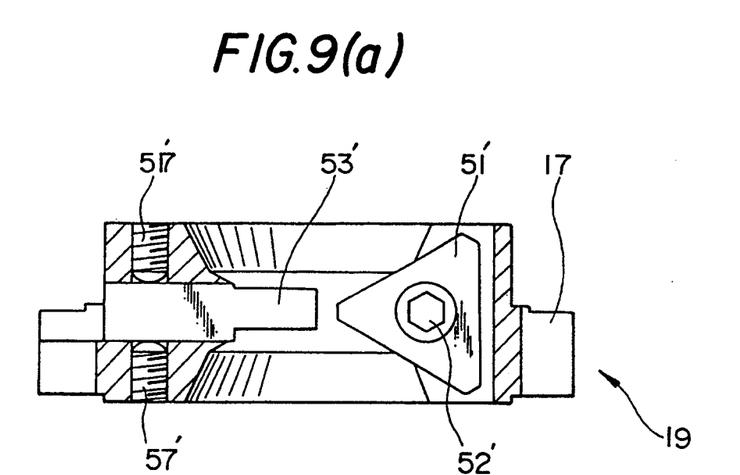
FIG. 9(a) is a sectional view of the FIG. 8(a). (b) is a top plan view of the (a).
Figure 9B:
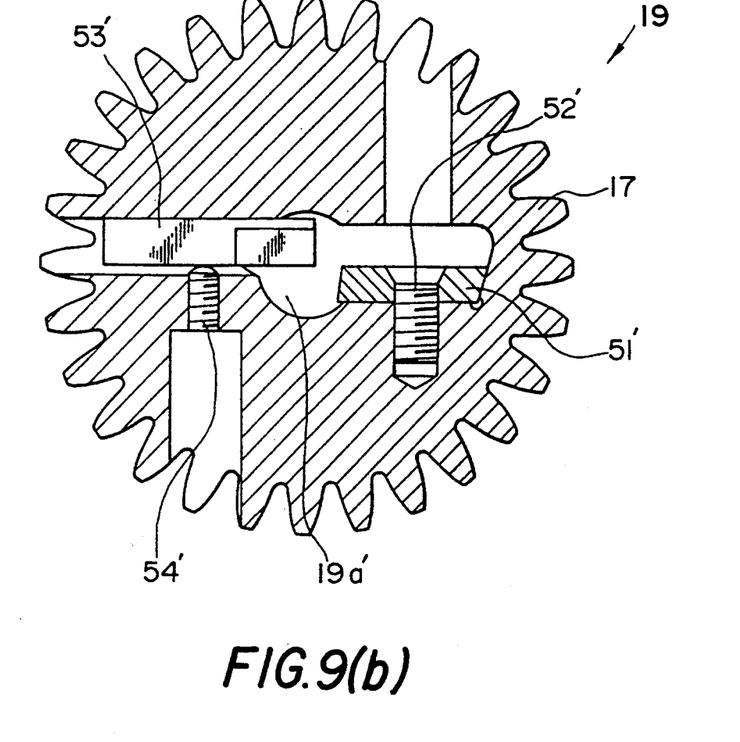

FIGS. 8 and 9 is another example of the present invention. The holder 19 is rotated by a consecutive rotational movement of pinion gear, main gear body, worm wheel, worm gear, power transmission shaft and power driving source. The head of the fixing screw is securely tightened so as not to protrude beyond the surface of the blade. The characteristics of the holder is such that said holder is constructed to provide the empty space portion through the holder. The complete empty space is provided around the contour of the whole blades which contact the side surface and edge surface of the tips to be cut and repaired. Due to existence of this complete empty space no cut powder of the welding electrode tips accumulates in the holder. This kind of empty space give utmost favorable result to expel the cut powder of the electrode tips. Thus, useful life of the cutting blade becomes far longer than the life of the conventional cutting blades.

Figure 10:
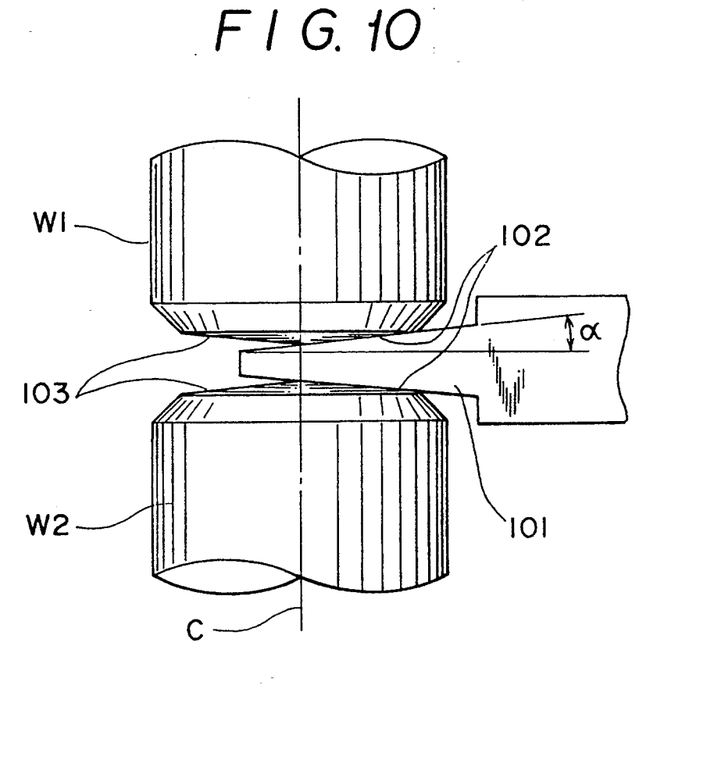
FIG. 10 relates to a side view of another embodiment showing a state of cutting and repairing the electrode tip almost flatly.

FIG. 10 indicates an example of another embodiment of the tip dresser of the present invention. A side view which indicates a state to cut and repair the tip portion of the electrodes W1 and W2 almost flatly is illustrated. The cutting blade 102 of the cutting blade body 101 is slightly slanted from the blade body to the tip of the blade. The blade 102 has an inclination of $\alpha$ degree to the axial line which is perpendicular to the vertical center line C. Accordingly, when electrode tips W1 and W2 are cut and repaired by the cutting blade 101, the edge surface 103 of the electrode presents a conical shape having tip portion on the rotational center line C. The tapered angle at edge surface 103 is determined by the inclination $\alpha$ of the blade 102. The inclination $\alpha$ smaller the more desirable welding finish of the electrode tips is obtained. It was proved in the experiment the degree of inclination of the blade 102 is most desirable when set within 0.1–2.0 degree.

In practical cutting and repairing operation by the blade 101 at the tip portion 103 of the electrode tips W1 and W2, the cutting blade 101 is inserted into the gap between W1 and W2. The electrode tips W1 and W2 are moved perpendicularly in parallel with rotational axial line C and the cutting blade 101 rotates around the rotational axial line C. The tip portion of the cutting blade 101 which extends beyond the axial line C does not contact with the tip portion 103 of the electrode tips W1 and W2 due to existence of the slight inclination $\alpha$ of the blade body. Accordingly, the cutting blade 102 never cut the tip portion 103 adversely. Thus, no burr is generated at the tip portion 103.

Figures 11A, 11B, 11C:
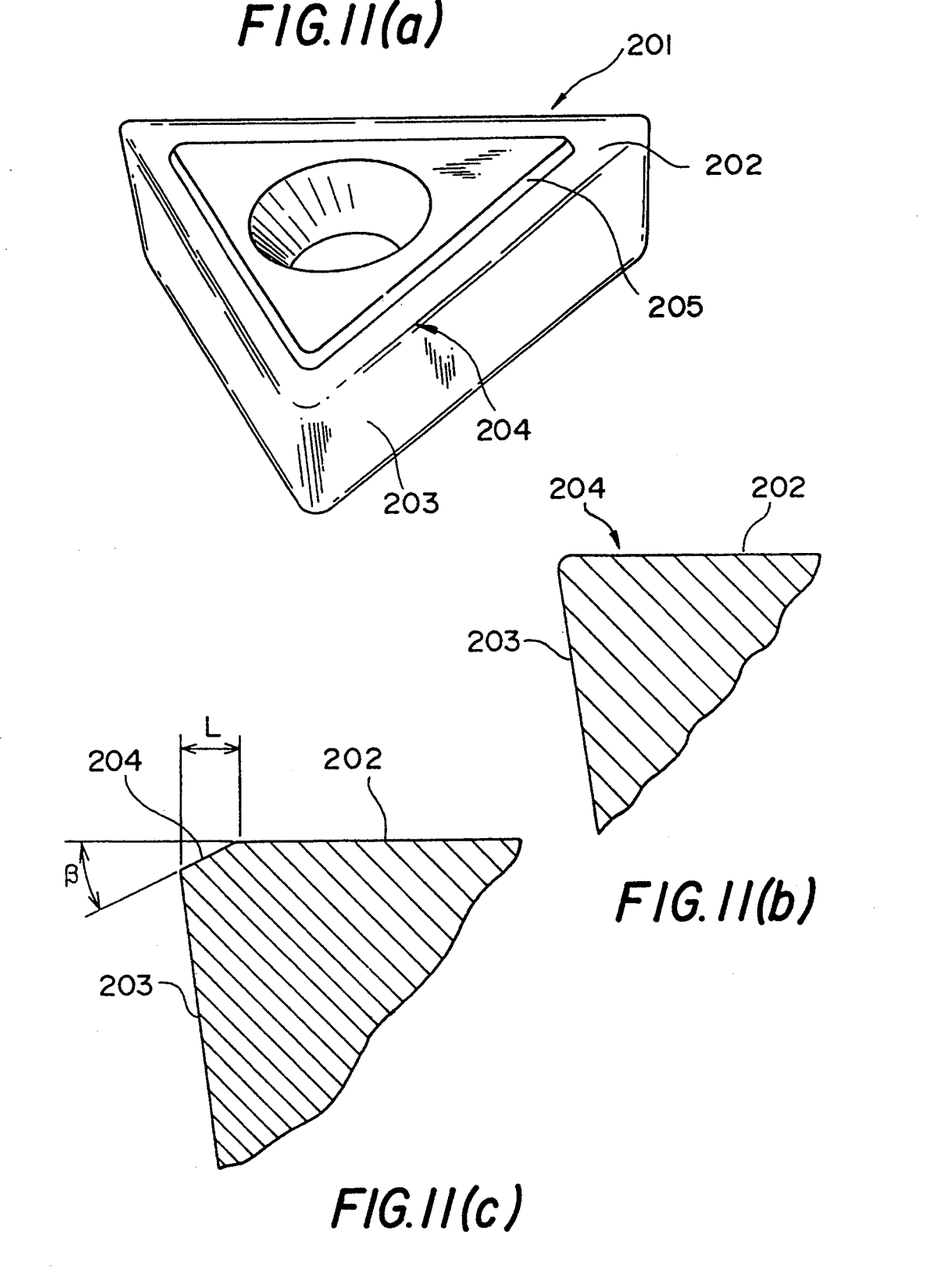

FIG. 11 indicates an example of another embodiment of the tip blade of a throwaway tip dresser of triangle shape with a through-hole. (a) indicates a perspective view of a throwaway tip dresser of triangle shape whose tip of the cutting blade is provided with a slight round finish, (b) and (c) indicate cross sectional view of the tip of the cutting blade. The reference numeral 201 indicates a throwaway tip dresser of triangle shape with a through-hole, reference numeral 201 indicates rake face, 203 indicates flank, 204 indicates blade and 205 indicates tip breaker. As shown in the figure the cutting blade 204 is imparted from rake face 202 through flank 203 a small round contour by grinding work. As welding electrode tip is not so hard it is not always required to finish by grinding work, but, if necessary, it is recommended to impart known horning finish. Also in FIG. 11 an example of a throwaway chip of triangle shape with a through-hole 201 is indicated with slight round finish on the tip of the cutting blade 204. It is not limited to this kind of contour, but any kind of such blades are applied. In addition to this slight round finish of (b), chamfering like (c) or combination finish of (b) and (c) is also applied.

The welding electrode tip of chrome cupper made with 12 mm outer diameter whose tip is to be cut and repaired to 6.5 mm is tested. As shown in figure (c) the cutting dimension of the tip of the blade of the throwaway chip is as follows: tapered width L is 0.1 mm–0.2 mm and tapered angle $\alpha$ is approximately 20 degree. The applicant tried many experiments and found the taper length of 0.15 mm presented the best result.

ADVANTAGES OF THE INVENTION

In the operation of a large anmount of tip dressers at a time, a robot is naturally applied (not shown) for mounting tips and replacing cutting blades. It is required, according to the present invention, as described in the foregoing, to grind or replace only one blade which has been damaged or worn out. It is unnecessary to replace whole blades. It is not so troublesome to grind or to replace the blade when such work is required in operation.

As there is provided in the holder a groove making a complete empty space it expels every cut powder of electrode tip through said empty space, thus, it is possible to prevent the blade from being damaged by accumulation of the cut powder of the electrode tips. There are also provided in the holder with the first tapered portion and the second tapered portion. The welding electrode tips become swingable and therefore any burr which was oftenly generated in conventional tip dresser is easily eliminated. Thus the high grade electrode chips are produced. Welding electrode tips with angle are also treated according to the present invention. The cost with respect to blade and troublesome concerning replacement work thereof are considerably decreased.

What is claimed is:

1. A rotative cutting tool of a tip dresser for cutting and repairing electrode tips in electric welding machine said rotative cutting tool comprising;
   a cutting blade holder of disc shape, with an upper and lower portion and a central and peripheral portion wherein the peripheral portion is provided with a gear for rotating said cutting blade holder;
   recesses of frustconical shape provided in a central upper portion and a central lower portion of said cutting blade holder;
   a groove vertically passing through said cutting blade holder substantially in a radial direction of said holder;
   a first cutting blade in said groove for cutting a side surface of said electrode tips at a portion slightly protruded from an inclined plane to compose said frustconical shape in said groove and a second cutting blade in said groove for cutting an edge portion of said electrode tips slightly protruded from at least a bottom of one of said recesses; and
   mounting means for radially adjustable mounting of at least one of said first and second cutting blades.

2. A rotative cutting tool of a tip dresser for cutting and repairing electrode tips in electric welding machine said rotative cutting tool comprising;
   a cutting blade holder of disc shape, with an upper and lower portion and a central and peripheral portion wherein the peripheral portion is provided with a gear for rotating said cutting blade holder;
   recesses of frustconical shape provided in a central upper portion and a central lower portion of said cutting blade holder;
   a groove vertically passing through said cutting blade holder substantially in a radial direction of said holder; and
   a first cutting blade for cutting a side surface of said electrode tips at a portion slightly protruded from an inclined plane to compose said frustconical shape in said groove and a second cutting blade for cutting an edge portion of said electrode tips slightly protruded from at least a bottom of one of said recesses;

wherein said recesses are provided with a first tapered portion having the same angle as the angle of the first cutting blade and a second tapered portion having a different angle from the angle of said first tapered portion.

3. A rotative cutting tool of a tip dresser according to claim 1, wherein in said first cutting blade is provided with a provided with a protrudent amount of 0.1–0.4 mm.

4. A rotative cutting tool of a tip dresser according to claim 1, wherein the first cutting blade and the second cutting blade are mounted separately in the holder and a clearance angle of the first cutting blade to cut the edge surface is defined to be within the scope of 1–5 degree.

5. A rotative cutting tool of a tip dresser according to claim 1, wherein the second cutting blade is slightly slanted from a body to a tip of said second cutting blade so as to provide for a cut finish of conical shape on a tip portion of the welding electrode tip.

6. A rotative cutting tool of a tip dresser according to claim 1, wherein said first cutting blade comprising a slight round portion by grinder polishing on a tip portion of the first cutting blade.

7. A rotative cutting tool of a tip dresser according to claim 1, wherein a tapered chamfer width of the first cutting blade is defined within 0.1–0.2 mm.

8. A rotative cutting tool of tip dresser according to claim 1, wherein said groove has sufficiently larger width than the width of the cutting blades and side surface of said cutting blade where said cutting blades contact with the electrode tip construct a complete empty space through a hole.

9. A method for mounting the rotative cutting blade of a tip dresser in a diametric groove in a holder comprising securely fixing a first cutting tool of triangular shape having blades at upper and lower portions by inserting a screw on an inner surface of a holder, the screw being inserted against said first cutting tool and through a cut hole provided from the outer surface of said holder to said groove and securely fixing a second cutting tool of square bar shape having blades at upper and lower portions to cut edge surface of the electrode tips by inserting a screw from the periphery of the holder into said groove and against said second cutting tool.

10. A rotative cutting tool of a tip dresser according to claim 1, wherein in said first cutting blade is provided with a provided with a protrudent amount of 0.15–0.2 mm.

11. A rotative cutting tool of a tip dresser according to claim 1, wherein in said second cutting blade is provided with a provided with a protrudent amount of 0.1–0.4 mm.

12. A rotative cutting tool of a tip dresser according to claim 1, wherein in said second cutting blade is provided with a provided with a protrudent amount of 0.15–0.2 mm.

13. A rotative cutting tool of a tip dresser according to claim 1, wherein said second cutting blade comprising a slight round portion by grinder polishing on a tip portion of the second cutting blade.

14. A rotative cutting tool of a tip dresser according to claim 1, wherein a tapered chamfer width of the first cutting blade is defined within 0.15 mm.

15. A rotative cutting tool of a tip dresser according to claim 1, wherein a tapered chamfer width of the second cutting blade is defined within 0.1–0.2 mm.

16. A rotative cutting tool of a tip dresser according to claim 1, wherein a tapered chamfer width of the second cutting blade is defined within 0.15 mm.

17. A rotative cutting tool of a tip dresser according to claim 1, wherein the first cutting blade and the second cutting blade are integrally formed and an end of said second cutting blade extends to the center of said cutting holder.

* * * * *